United States Patent
Qi

(10) Patent No.: US 8,077,163 B2
(45) Date of Patent: Dec. 13, 2011

(54) MOBILE DEVICE WITH ACOUSTICALLY-DRIVEN TEXT INPUT AND METHOD THEREOF

(75) Inventor: Yingyong Qi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1237 days.

(21) Appl. No.: 11/510,333

(22) Filed: Aug. 24, 2006

(65) Prior Publication Data

US 2008/0048988 A1    Feb. 28, 2008

(51) Int. Cl.
*G06F 3/043* (2006.01)

(52) U.S. Cl. ...... 345/177; 345/178; 345/179; 178/18.04

(58) Field of Classification Search .......... 345/177–179, 345/204; 178/18.01, 18.04
See application file for complete search history.

(56) References Cited

U.S. PATENT DOCUMENTS

| | | | |
|---|---|---|---|
| 4,814,552 A | 3/1989 | Stefik et al. | |
| 6,348,914 B1 | 2/2002 | Tuli | |
| 2002/0077143 A1* | 6/2002 | Sharif et al. | 455/550 |
| 2002/0167862 A1* | 11/2002 | Tomasi et al. | 367/118 |
| 2003/0197692 A1* | 10/2003 | Tsuji | 345/179 |
| 2005/0069149 A1* | 3/2005 | Takahashi et al. | 381/91 |
| 2006/0077188 A1 | 4/2006 | Byun | |
| 2006/0183505 A1* | 8/2006 | Willrich | 455/566 |

FOREIGN PATENT DOCUMENTS

| | | |
|---|---|---|
| EP | 1128320 | 8/2001 |
| TV | I222810 | 10/2004 |
| TW | 520592 | 2/2003 |
| TW | 548997 | 8/2003 |
| TW | 200415368 | 8/2004 |
| WO | 0011596 | 3/2000 |
| WO | 0135329 | 5/2001 |
| WO | 0203059 | 1/2002 |

OTHER PUBLICATIONS

International Search Report, PCT/US07/076783, International Search Authority, European Patent Office, Apr. 10, 2008.
Written Opinion, PCT/US07/076783, International Search Authority, European Patent Office, Apr. 10, 2008.
International Preliminary Report on Patentability, PCT/US07/076783, International Preliminary Examining Authority, European Patent Office, Munich, Germany, Oct. 29, 2008.
Taiwanese Search report -096131525- TIPO - Jul. 17, 2010.
Parra, et al., "Convolutive Blind Separation of Non-Stationary Sources," IEEE Transactions on Speech and Audio Processing, vol. 8, No. 3, May 2000, pp. 320-327. Rabinkin, et al., "A DSP Implementation of Source Location Using Microphone Arrays," J. Acoust. Soc. Am., vol. 99, Apr. 1996, p. 2503.
Visser, et al., "A Spatio-temporal Speech Enhancement for Robust Speech Recognition in Noisy Environments," Speech Communication, vol. 41, 2003, pp. 393-407.

* cited by examiner

*Primary Examiner* — Amr Awad
*Assistant Examiner* — Andre Matthews
(74) *Attorney, Agent, or Firm* — Nicholas A. Cole

(57) ABSTRACT

A mobile device has a housing having first and second display areas. A mic-array is integrated into the housing and has microphones operable to sense sound signals at multiple locations on the housing from a sound pen when handwriting an alphanumeric symbol on a surface separate from and in proximity to the housing. A handwriting-to-text converter is operable to graphically represent, for display on the first display area, simulated handwritten traces of the alphanumeric symbol and to convert the alphanumeric symbol into a computer-readable interchange code, representative of the alphanumeric symbol, for display in the second display area.

21 Claims, 9 Drawing Sheets

MOBILE DEVICE WITH ACOUSTICALLY-DRIVEN TEXT INPUT AND METHOD THEREOF

BACKGROUND OF THE INVENTION

1. Field of the Invention

The present invention relates to mobile devices and, more particularly, to a mobile device with an acoustically-driven handwriting-to-text assembly.

2. General Background

Current manufacturing trends in mobile devices seek to reduce the size of the device so that the user can place the mobile device in an easily accessible location, such as a purse or pocket. Many mobile devices are as small as, or smaller than, a user's hand and are commonly termed "hand-held devices". Consequently, there are significant size constraints for the display and keypad/navigational tools to be implemented on the limited real estate of such a device.

For example, cellular telephones generally do not provide a fully functional keyboard such as a keyboard with one letter per button. Instead, a numerical keypad is provided with one number per key. The numbered keys may allow three or four alphabetical letters to be entered. However, this type of keypad commonly requires multiple pushes of a single key to enter a single letter. For example, the number "7" key allows a user to enter one of four (4) alphabet letters P, Q, R and S. In order to enter an S, the "7" key is pressed four times. Then, to enter the next letter, the user must either wait for the cursor on the display to move to the immediately adjacent space or press a designated navigational key to move the cursor to the immediately adjacent space. As can be appreciated, this text entering process is tedious, cumbersome and time consuming. The text entering process is one of the potential impediments to the ubiquitous use of the mobile communications device as a versatile digital device.

A touch sensitive screen is one attempt to solve the problem with text input. However, in view of the current manufacturing trends, the size of the touch sensitive screen (with or without a stylus) is insufficient for the screen to provide an accurate mechanism for text input.

Another text input tool is a digital pen. Digital pen technology has an advantage that it does not limit writing to the surface of the screen. However, implementation of a digital pen requires the installation of complex circuitry in the device and other adaptations to provide communications between the device and digital pen.

In general, conventional mobile communication devices do not provide a user with a simple means of entering text such as by simply handwriting one or more alphanumeric symbols with a sound pen on any surface.

Additionally, conventional mobile communication devices do not utilize a microphone for both a speech input mode, such as during a telephone call, and a text input mode where an emitted sound signal from a sound pen is sensed. The sensed sound signal is employed in a pen location tracking process to graphically represent a handwritten alphanumeric symbol.

Furthermore, conventional mobile communication devices do not employ a microphone array that can be employed for noise reduction processing of the speech input signal and, alternately, for a pen location tracking process to graphically represent a handwritten alphanumeric symbol.

Conventional mobile communication devices, such as a cellular telephone, do not employ two display areas where one display area is used to display a graphical representation of a simulated handwritten alphanumeric symbol handwritten or traced on any suitable writing surface.

SUMMARY OF THE INVENTION

In order to solve the aforementioned problems, an object of the present invention is to provide a mobile device comprising a housing having first and second display areas and a microphone array, commonly referred to as a mic-array, integrated into the housing. The mic-array has a plurality of microphones operable to sense sound signals at multiple locations on the housing from a sound pen when handwriting an alphanumeric symbol on a surface separate from and in proximity to the housing. The device also includes a handwriting-to-text converter operable to graphically represent, for display on the first display area, simulated handwritten traces of the alphanumeric symbol and to convert the alphanumeric symbol into a computer-readable interchange code, representative of the alphanumeric symbol, for display in the second display area.

Another object of the present invention is to provide a mobile device with a handwriting-to-text converter that includes an acoustically-driven location determination unit for determining a sequence of pen locations based on a difference in time of arrival and intensity of sound signals received by each respective microphone as the sound pen is moved during the handwriting.

Another object of the present invention is to provide a mobile device with a microphone array wherein at least one microphone of the array is a multimode microphone. In a first mode, the multimode microphone is operational in a speech input mode of the device. In a second mode, the multimode microphone is operational in a handwriting-to-text input mode of the device.

A further object of the present invention is to provide a mobile communication device with both a handwriting-to-text converter that is responsive to sound signals received by the microphone array (mic-array) in a handwriting-to-text input mode and a noise reduction processor coupled to the mic-array wherein the noise reduction processor reduces noise from the speech input signal when received by the mic-array.

Yet another object of the present invention is to provide a mobile device that includes a two microphone mic-array with at least one microphone serving as a multimode microphone. This implementation requires minimal additional hardware changes in a cellular telephone while facilitating convenient and accurate handwritten text input.

The above and other objects and features of the present invention will become apparent from the drawings, the description given herein, and the appended claims.

BRIEF DESCRIPTION OF THE DRAWING

The foregoing summary, as well as the following detailed description of preferred embodiments of the invention, will be better understood when read in conjunction with the accompanying drawings. For the purpose of illustrating the invention, there is shown in the drawings embodiments which are presently preferred.

It should be understood, however, that the invention is not limited to the precise arrangement shown. In the drawings.

DETAILED DESCRIPTION OF THE PREFERRED EMBODIMENTS

While this invention is susceptible of embodiments in many different forms, this specification and the accompanying drawings disclose only some forms as examples of the use of the invention. The invention is not intended to be limited to the embodiments so described, and the scope of the invention will be pointed out in the appended claims.

The preferred embodiment of the mobile device according to the present invention is described below with a specific application to a cellular telephone. However, it will be appreciated by those of ordinary skill in the art that the present invention is also well adapted for other types of devices with text input. For example, the mobile device can be a wireless telephone, a satellite telephone, a mobile telephone, a cellular telephone, a personal digital assistant (PDA), a laptop computer, a notebook computer, or any other personal communication or computing device. Since it is prohibitive to describe each and every device type, the exemplary embodiment described herein is for a cellular telephone.

Figure 1:
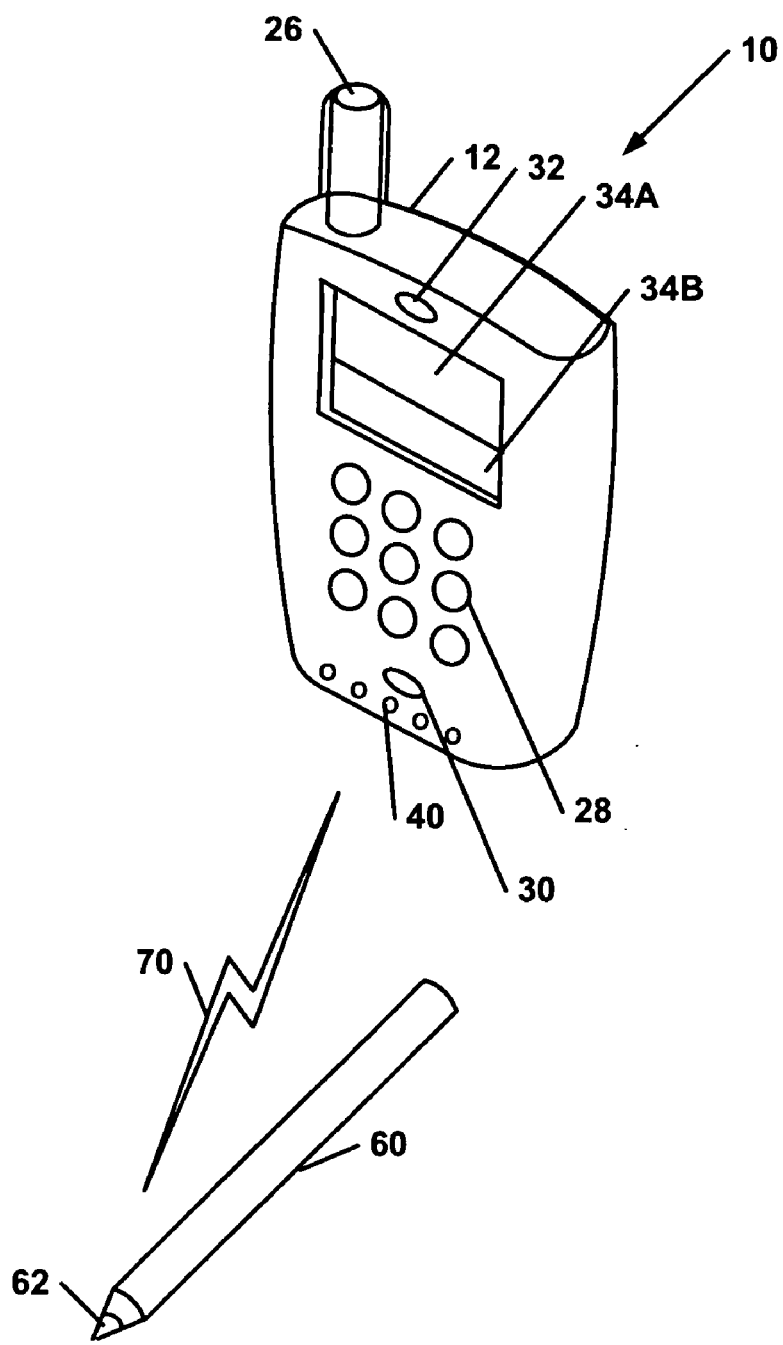
FIG. 1 illustrates a perspective view of a mobile device with a sound pen.
Figure 2:
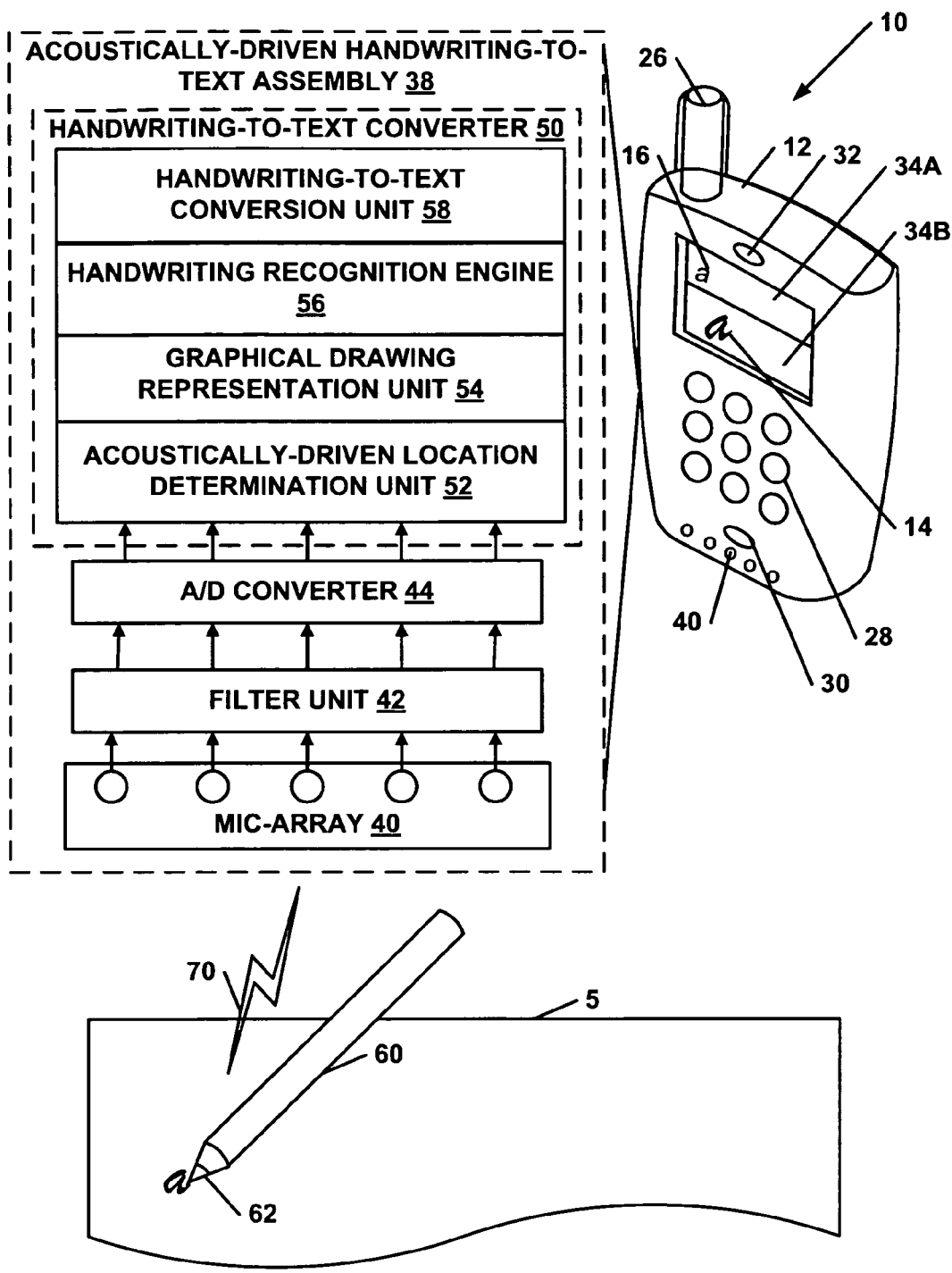
FIG. 2 illustrates a perspective view of a mobile device with the acoustically-driven handwriting-to-text assembly shown in phantom and sound pen writing on a surface.
Figure 3:
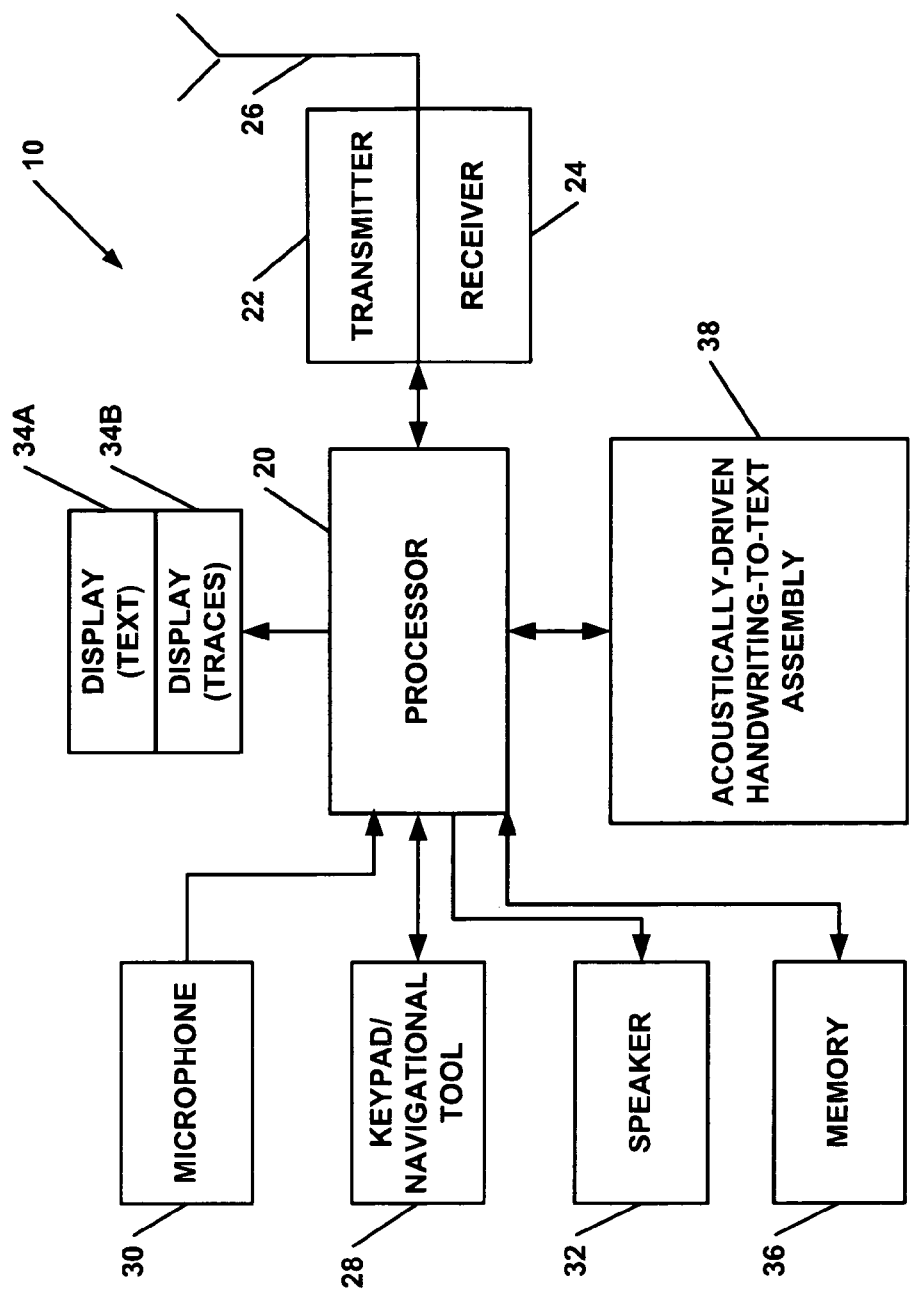
FIG. 3 illustrates a block diagram of the mobile device of FIG. 1.

Referring now to the drawings in detail, wherein like numerals are used to indicate like elements throughout, there is shown in FIGS. 1-3 an embodiment of a mobile device, generally designated at 10, according to the present invention.

The mobile device 10 includes a housing 12 for housing and integrating a processor 20, a keypad/navigational tool 28 and displays 34A and 34B for navigating through operational functions and performing various computing functions of the device 10. The processor 20 communicates with a memory 36 to access the stored data or other software applications to carryout the pre-programmed functions of the mobile device 10. In the exemplary embodiment, the displays 34A and 34B are shown and described as separate displays. Thus, each display provides a distinct and separate display area. However, if desired, the displays 34A and 34B may be one display unit with two separate display areas.

The display areas can be scrolled in a conventional manner such as via the keypad/navigational tool 28. Furthermore, the display 34A functions as a convention display and displays other items. The displayed items may include icons such as, without limitation, icons or representations for a date, a time, a battery charge, and volume. The display 34A may also display a graphical user interface having data entry fields for entering text-based information, such as for storage in a phone book or for sending an email. Thus, an alphanumeric symbol 16 may be entered into a data entry field of the graphical user interface displayed by the display 34A.

The mobile device 10 further includes a transmitter 22 and a receiver 24 coupled to an antenna 26 for transmitting and receiving wireless communication signals. The transmitter 22 and the receiver 24 (transceiver) are coupled to the processor 20, such as without limitation, a digital signal processor (DPS) or an advanced RISC machine (ARM). The processor 20 is coupled to a speaker 32 and a microphone 30 for carrying out a telephone conversation and/or accepting speech input and providing other audible alerts.

The keypad/navigational tool 28 allows a user to enter alphanumeric information and navigate through the functions of the device 10. The functions of the device 10 include, without limitation, sending and receiving a call, storing telephone numbers and email addresses in the memory 36, browsing through the World Wide Web or Internet, and sending an email. In addition to the keypad/navigational tool 28, the mobile device 10 includes an acoustically-driven handwriting-to-text assembly 38 that receives a sound signal 70 in an inaudible frequency range (>20 kHz)) when a tip 62 of a sound pen 60 is pressed on a surface 5. The surface 5 may be any type of surface that allows users to write or trace alphanumeric symbols in their own handwriting.

The acoustically-driven handwriting-to-text assembly 38 includes a microphone array 40 (hereinafter referred to as "mic-array") having two or more microphones adapted to receive a sound signal 70. The output of each microphone of the mic-array 40 is sent to a filter unit 42 for filtering in the frequency range of the sound signal 70. In the exemplary embodiment, the sound signal 70 is analog and is converted into digital signals by an A/D converter 44 for input into a handwriting-to-text converter 50.

Figure 6:
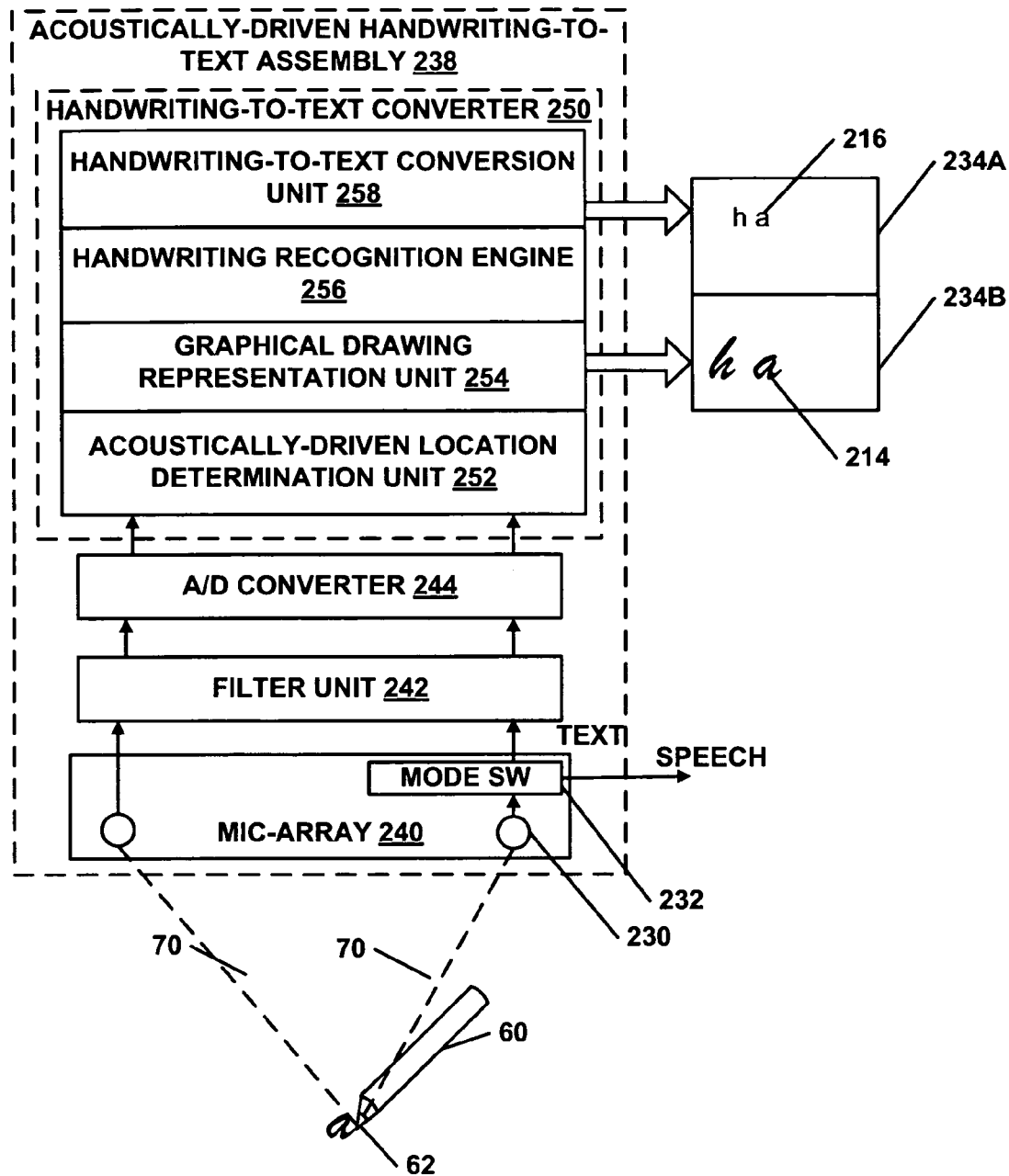
FIG. 6 illustrates an alternate embodiment of the acoustically-driven handwriting-to-text assembly with a two microphone mic-array.

In the example of a cellular telephone, the microphone 30 can be a dedicated microphone for speech input only. In the embodiment of FIG. 6, a mic-array 240 includes two microphones wherein one of the microphones designated with reference numeral 230, functions as a multimode microphone. In a first mode, the multimode microphone 230 is operational in a speech input mode of the device 10. On the other hand, in a second mode, the multimode microphone 230 is operational in a handwriting-to-text input mode of the device 10.

In operation, the output of the multimode microphone 230 is automatically switched via a mode switch 232 so that the received signal is not filtered by a filter unit 242 when the device is in the speech input mode. On the other hand, during the handwriting-to-text input mode, the multimode microphone 230 is automatically switched (if necessary) so that the received signal is filtered by the filter unit 242.

The embodiment of FIG. 6, which includes the two microphone mic-array 240 with one microphone serving as the multimode microphone 230, requires minimal additional hardware in a cellular telephone while facilitating convenient and accurate text input on mobile device 10.

The handwriting-to-text converter 50 includes an acoustically-driven location determination unit 52, a graphical drawing representation unit 54, a handwriting recognition engine 56 and a handwriting-to-text conversion unit 58. In operation, the graphical drawing representation unit 54 sends to the display area of the display 34B the graphical representation of the handwriting or trace on the surface 5 derived from processing the sound signal 70 and determining the location coordinates x and y for display. In the exemplary embodiment, the sound pen 60 does not create an "ink"-based image on the surface 5. However, the graphical drawing representation unit 54 simulates the handwritten traces 14 of a user's handwriting on the display 34B, as best seen in FIG. 2, using a sequence of location coordinates x and y.

With reference to FIG. 6, a sequence of handwritten traces 214 are shown as the script letters "ha" in the display 234B. On the other hand, the display 234A displays a sequence of standardized symbol(s) or character(s) 216 of the computer-readable interchange code(s) representing the trace or the handwriting via the handwriting-to-text conversion unit 258. The displayed locations of the handwritten traces 214 and the symbol(s) or character(s) 216 are to permit understanding and not to be limiting.

Referring again to FIG. 2, the handwriting recognition engine 56 interprets the graphical representation of the handwritten traces 14 using known handwriting recognition software, such as, without limitation, Hidden Markov Model (HMM) technology. Handwriting recognition technology is also disclosed in Z. Liu, J. Cai, and R. Buse, "Handwriting recognition," Berlin: Springer, copyright 2003. Some handwriting recognition software should be trained with the user's handwriting to ensure the accurate recognition of the handwritten traces 14. The handwriting-to-text conversion unit 58 is driven by the handwriting recognition engine 56 to convert the recognized handwritten traces 14 into computer-readable interchange codes such as America Standard Code for Information Interchange (ASCII), Extended Binary-Coded Decimal Interchange Code (EBCDIC) or the like, for use by the device 10. The handwriting-to-text conversion unit 258 in the FIG. 6 embodiment also uses the recognition result to display the alphanumeric character or symbol 216 in the display 234A in the form of a typed alphanumeric symbol.

Figure 4:
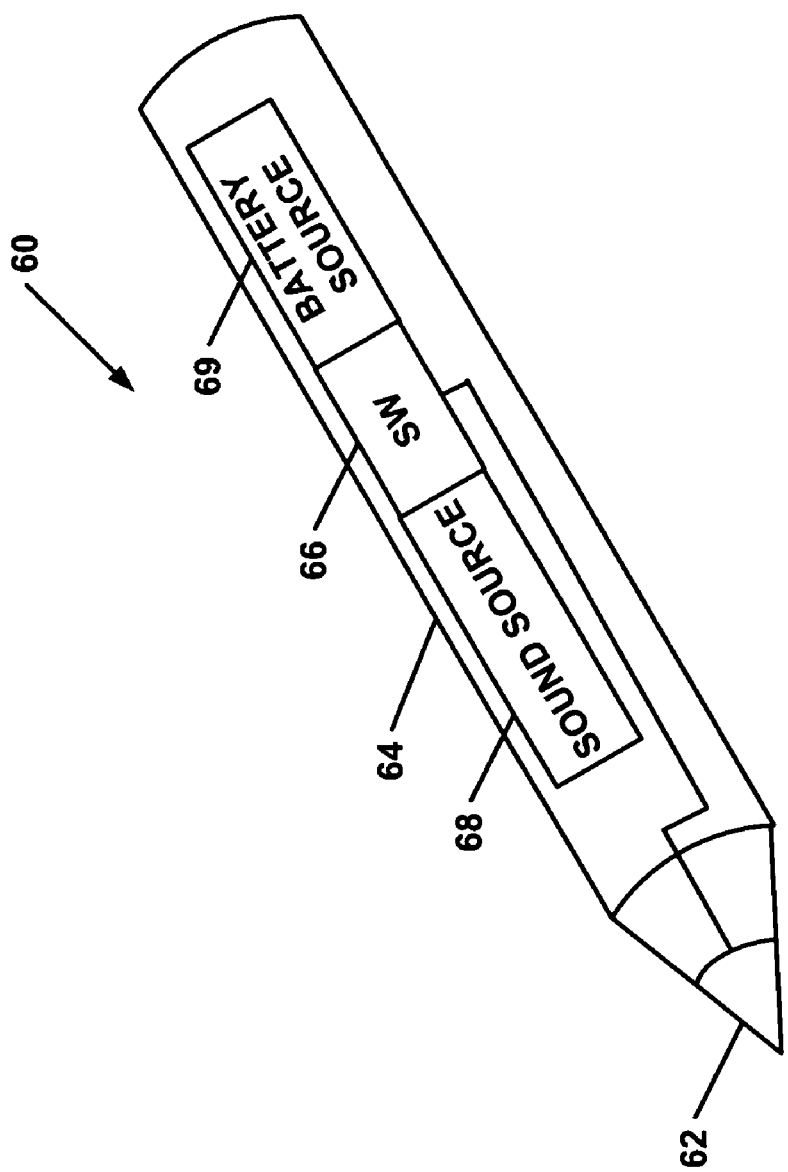
FIG. 4 illustrates a block diagram of a sound pen for use with the mobile device of FIG. 1.

The sound pen 60, as shown in FIG. 4, includes a pen-shaped housing 64 having a front end or tip 62. The tip 62, when pressed on the surface 5, causes the sound signal 70 to be emitted from a sound source 68. The sound source 68 is coupled to a battery or power source 69. The battery 69, the sound source 68 and a switch 66 are positioned inside the housing 64. In the exemplary embodiment, the switch 66 is generally opened (off) when the tip 62 is not in a pressed state. However, when the tip 62 is pressed against a surface, the switch 66 closes and power is delivered to the sound source 68 so that the sound signal 70 is emitted. When handwriting an alphanumeric input on the surface 5, the tip 62 should remain pressed to complete the formation of at least one character.

The acoustically-driven handwriting-to-text assembly 38 of FIG. 2 and the acoustically-driven handwriting-to-text assembly 238 of FIG. 6 differ in that the mic-array of FIG. 6 has only two microphones while the mic-array of FIG. 2 has more than two microphones.

In general, the location of the sound pen 60 will be tracked by the differences in time of arrival and in intensity between the signal received by the mic-array 40 or 240. The trace 14 or 214 will be displayed on the display 34B or 234B and recognized as alphanumeric symbols using contemporary handwriting recognition technology. The recognized alphanumeric symbols 16 or 216 are displayed on the display 34A or 234A.

Figure 7:
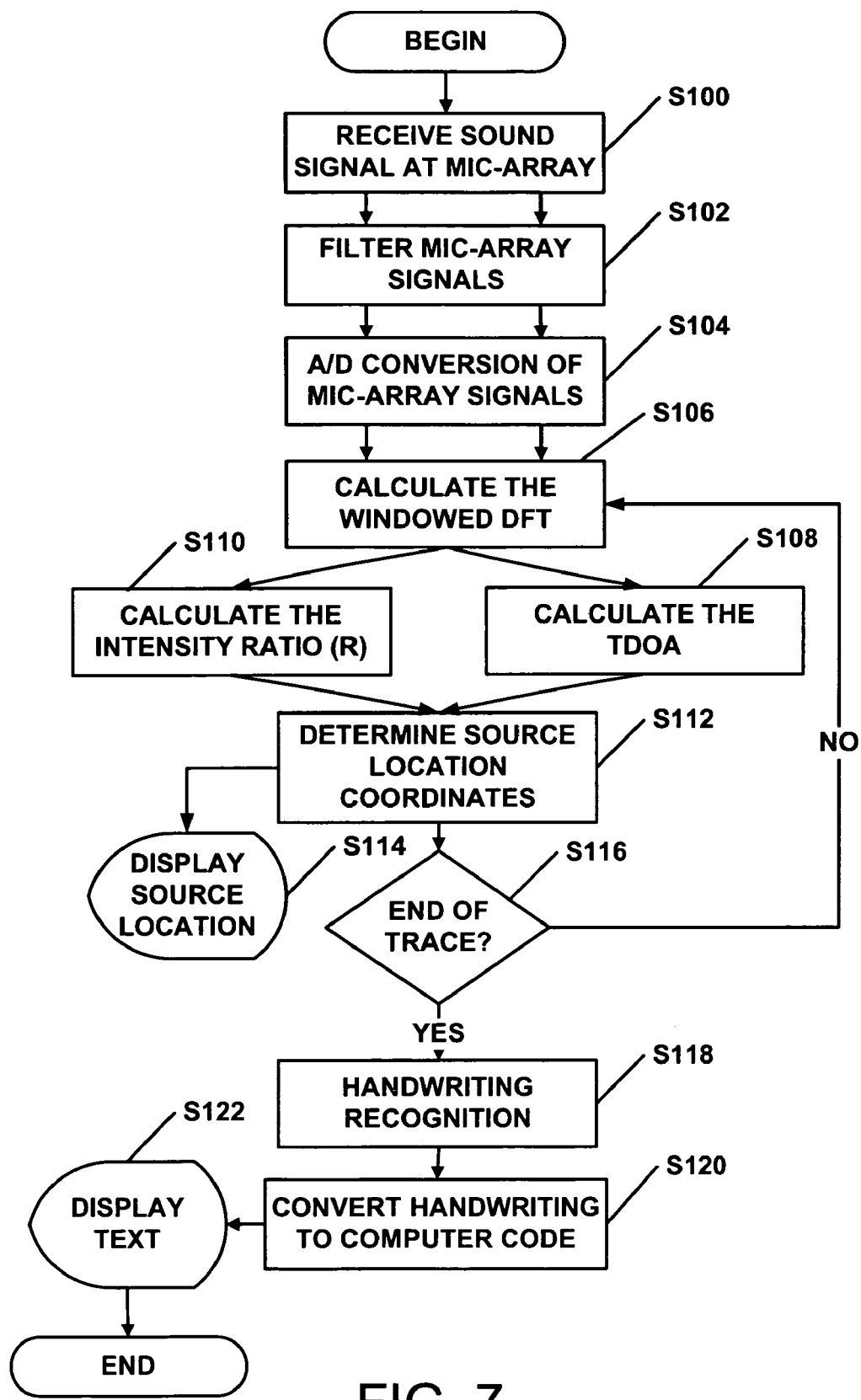
FIG. 7 illustrates a flowchart of the method for acoustically-driven handwriting-to-text input.

The acoustic method for text input will now be described in relation to FIGS. 6-8 where FIG. 6 includes the two microphone mic-array 240. During alphanumeric input (hereinafter referred to as "text input"), the mobile device 10 is placed on a flat surface 5 with the mic-array 240 unobstructed from picking up the sound signal 70. In other words, the mic-array 240 and/or the front face of the device is placed face-up. Nevertheless, the mic-array 240 may be placed at other locations on the device housing depending on the device's functionality and the location of the display.

The user handwrites a desired alphanumeric symbol on the surface 5 via the sound pen 60 at a location in close proximity to the mic-array 240 that permits the sound signal 70 to be captured by the mic-array 240, at step S100. To permit understanding of the method, the sound signal 70 of FIG. 6 is shown as two lines in phantom beginning at the pen tip 62, spreading to form a "V" and terminating at the mic-array 240. The sound pen 60 emits a sound in the inaudible frequency range (>20 kHz) when pressed.

Figure 8:
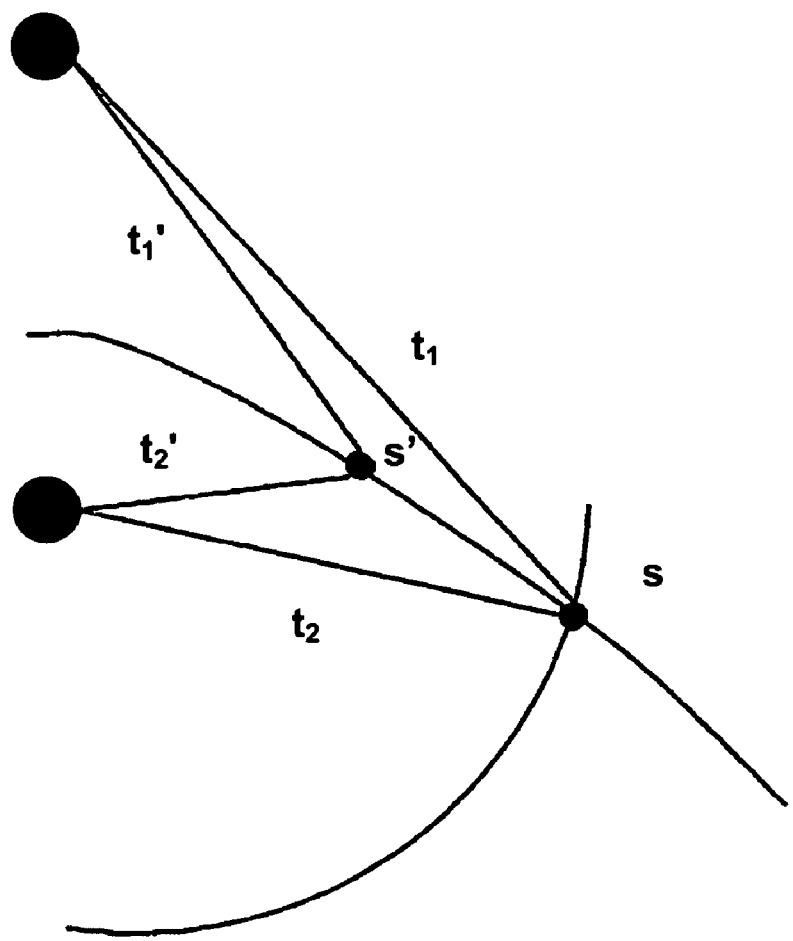
FIG. 8 illustrates a graphical plot of the source location determination algorithm.

With specific reference to the graphical plot shown in FIG. 8, the two larger black dots represent the two microphones of the mic-array 240. The point (black dot) labeled s is the source location. The values $t_1$, $t_2$ represent the times needed for the signal to travel from the source to the two microphones. The times $t_1'$, $t_2'$ and the point s' are the same as points $t_1$, $t_2$, and s but at a different location and time.

Referring to the flowchart of FIG. 7, the operation of the mobile device 10 will now be described. In step S100, the sound pen 60 produces signals which for exemplary purposes are narrow band signals. Step S100 is followed by step S102 where the received signals by the mic-array 240 are filtered by the filter unit 242. Step S102 is followed by step S104 where the filtered signals are converted to digital signals via the A/D converter 244 for input into the handwriting-to-text converter 250. The mic-array 240 receives the signals as set forth in equation Eq. (1):

$$y_1(l)=\alpha_1 s(l-t_1)+\eta_1(l)$$

$$y_2(l)=\alpha_2 s(l-t_2)+\eta_2(l) \quad \text{Eq. (1)}$$

where l is the discrete time index; $t_1$ and $t_2$ are the times needed for the signal to travel from the source pen 60 to the two microphones, respectively; $\alpha_i$, where i=1,2, is the amplitude of the received sound signal 70; and $\eta_i$, where i=1,2, is the background noise that is uncorrelated to or independent of the signal s(l) and to each other. Note that, because the assembly 238 is time invariant, the correlation of the two signals depends only on the relative time delay of arrival (TODA), $\tau=|t_1-t_2|$, not the absolute value of $t_1$ and $t_2$.

The source location determination, by the acoustically-driven location determination unit 252, first estimates the TDOA on a continuous (window by window) basis using the correlation property of the time-invariant system. Each window is a short segment of the received signals in the range of 5-20 msec. To estimate $\tau$, the discrete Fourier Transforms (DFTs) of the received signals in a given time window of length L is computed at step S106 as defined by equation Eq. (2)

$$Y_1(k)=\alpha_1 S(k)+N_1(k)$$

$$Y_2(k)=\alpha_2 S(k)e^{-j\omega k\tau}+N_2(k) \quad \text{Eq. (2)}$$

where S(k) is the L-point DFT of the source signal s(l) (k=0, 1, , , , , L/2), $\omega_k=2\pi k/L$. A cross correlation of the DFT can be computed in equation Eq. (3) as $$Y_{12}=Y_1(k)Y_2^*(k) \quad \text{Eq. (3)}$$

where * denotes the conjugate operator. The TDOA, $\tau$, now appears as part of the complex phase term and as such, is not restricted to integer values. Hence, the TDOA is calculated in step S108 using the estimate in equation Eq. (4) as $$\tau = \max_\tau IDFT\left(\frac{Y_{12}}{|Y_1(k)||Y_2(k)|}\right) \quad \text{Eq. (4)}$$

assuming the intensity of the noise is a lot smaller than that of the received signal. An example of source locating using a microphone array is disclosed in D. Rabinkin, R. Renomeron, A. Dahl, J. French, J. Flanagan, and M. Bianchi, "A DSP Implementation of Source Location Using Microphone Arrays," J. Acoust. Soc. Am., vol, 99, p. 2503, April copyright 1996.

The TDOA, τ, only defines the difference in the signal arrival time and, thus, a hyperbolic curve on the 2D plane as shown in FIG. 8. Because any point on the hyperbolic curve will produce the same τ another constraint is needed to uniquely specify the location of the source pen 60. This can be accomplished by the intensity information of the received signals.

According to theories of sound transmission, the amplitude (equation Eq. (5)) of the acoustic signal is inversely proportional to the square of the distance between the sound source (sound pen 60) and the receiver (each microphone of mic-array 240), therefore $$\alpha_i \propto \frac{1}{r_i^2} \quad i = 1, 2 \qquad \text{Eq. (5)}$$

$$\frac{\alpha_1}{\alpha_2} = \frac{r_2^2}{r_1^2}$$

where $r_i$, i=1,2 is the Euclidean distances between the sound source 60 and one of the microphones of the mic-array 40. Because the amplitude ratio (calculated at step S110), defined in equation Eq. (6), as $$R = \frac{\alpha_1}{\alpha_2} \qquad \text{Eq. (6)}$$

is a constant during a short time window and can be estimated from the received signals at the microphones, the equation Eq. (7)

$$\frac{r_2^2}{r_1^2} = \frac{(x - x_2)^2 + (y - y_2)^2}{(x - x_1)^2 + (y - y_1)^2} = R \qquad \text{Eq. (7)}$$

will produce another quadratic curve (circle), where $x_i, y_i$, i=1,2 are the known, fixed coordinates of the microphones. The intersection of this curve with the hyperbolic curve from the TDOA will determine the source location coordinates x and y (calculated at step S112), completing the source location estimation within the given time window.

As coordinates x and y are determined at step S112, the graphical drawing representation unit 254 maps the instant source x and y coordinates to the display area of the display 234B for display thereon at step S114. A sequence of pen locations or x and y coordinates are determined to form the handwritten traces. A collection of handwritten traces may represent one or more alphanumeric symbols.

At step S116 a determination is made whether the trace (handwriting) is complete. If the decision is "NO", the process returns to step S106 until the sound pen 60 is lifted momentarily or completely to end the trace. The graphical drawing representation unit 254 determines a sequence of pen location points which are displayed. If the trace is finished, the data is sent to the handwriting recognition engine 256 at step S118 where the handwritten traces 214 are recognized. Step S118 is followed by step S120 where the recognized handwriting is converted into computer-readable interchange code, such as ASCII, EBCDIC or the like, by the handwriting-to-text conversion unit 258. The converted alphanumeric character or symbol 216 is displayed on display 234A at step S122 and can be stored, used as text input for entering names, data and messages or used to evoke the navigational functions in the device 10.

Figure 5:
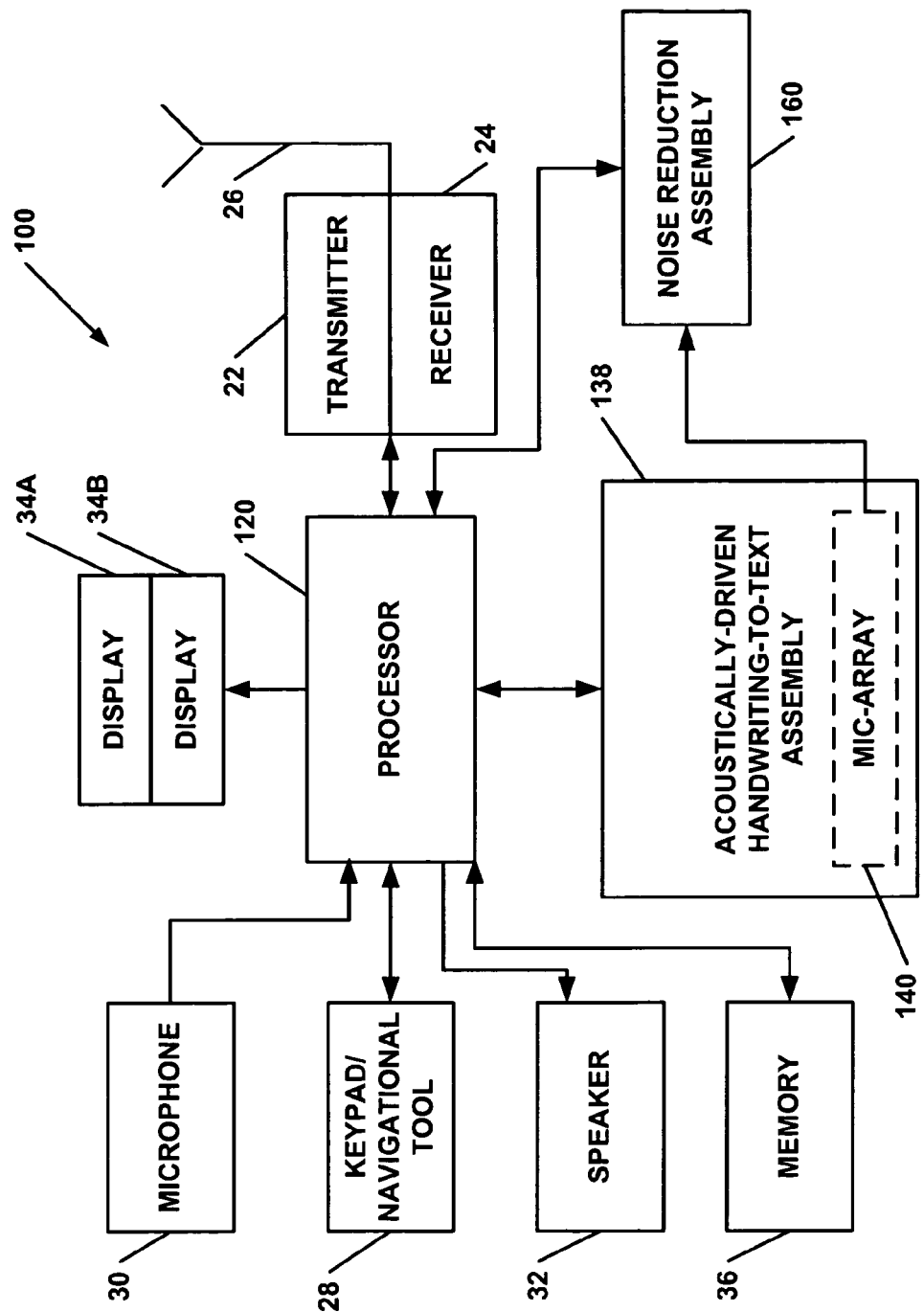
FIG. 5 illustrates an alternate embodiment of the block diagram of the mobile device to include handwriting-to-text conversion and noise reduction.

An alternative embodiment of the mobile device 100 is shown in FIG. 5. The mobile device 100 employs, in addition to the acoustically-driven handwriting-to-text assembly 138, a noise reduction assembly 160. The noise reduction assembly 160 interfaces with the mic-array 140, having two or more microphones, and receives signals therefrom. The received signal would enable extraction of background noise in the environment so that the background noise can be eliminated during a telephone call as speech is entered via the microphone 30. In operation, while the noise reduction assembly 160 is operational, the other components of the acoustically-driven handwriting-to-text assembly 138 are deactivated. Likewise, when the acoustically-driven handwriting-to-text assembly 138 is operational, the noise reduction assembly 160 is deactivated. The operation of the noise reduction assembly 160 uses a temporal-spatial adaptive filter such as the blind source separation algorithm to separate the speech signal and the interfering noise. An example of blind source separation is disclosed by Lucas Para and Clay Spence in "Convolutive Blind Separation of Non-Stationary Sources," IEEE Transactions on Speech and Audio Processing, Vol. 8, No. 3, pp. 1063-6676, copyright 2000. Additionally, spatio-tempral speech enhancement is disclosed in E. Visser, M. Otsuka, and T. Lee, "A Spatio-temporal Speech Enhancement for Robust Speech Recognition in Noisy Environments," Speech Communication, vol. 41, pp. 393-407, copyright 2003.

Figure 9:
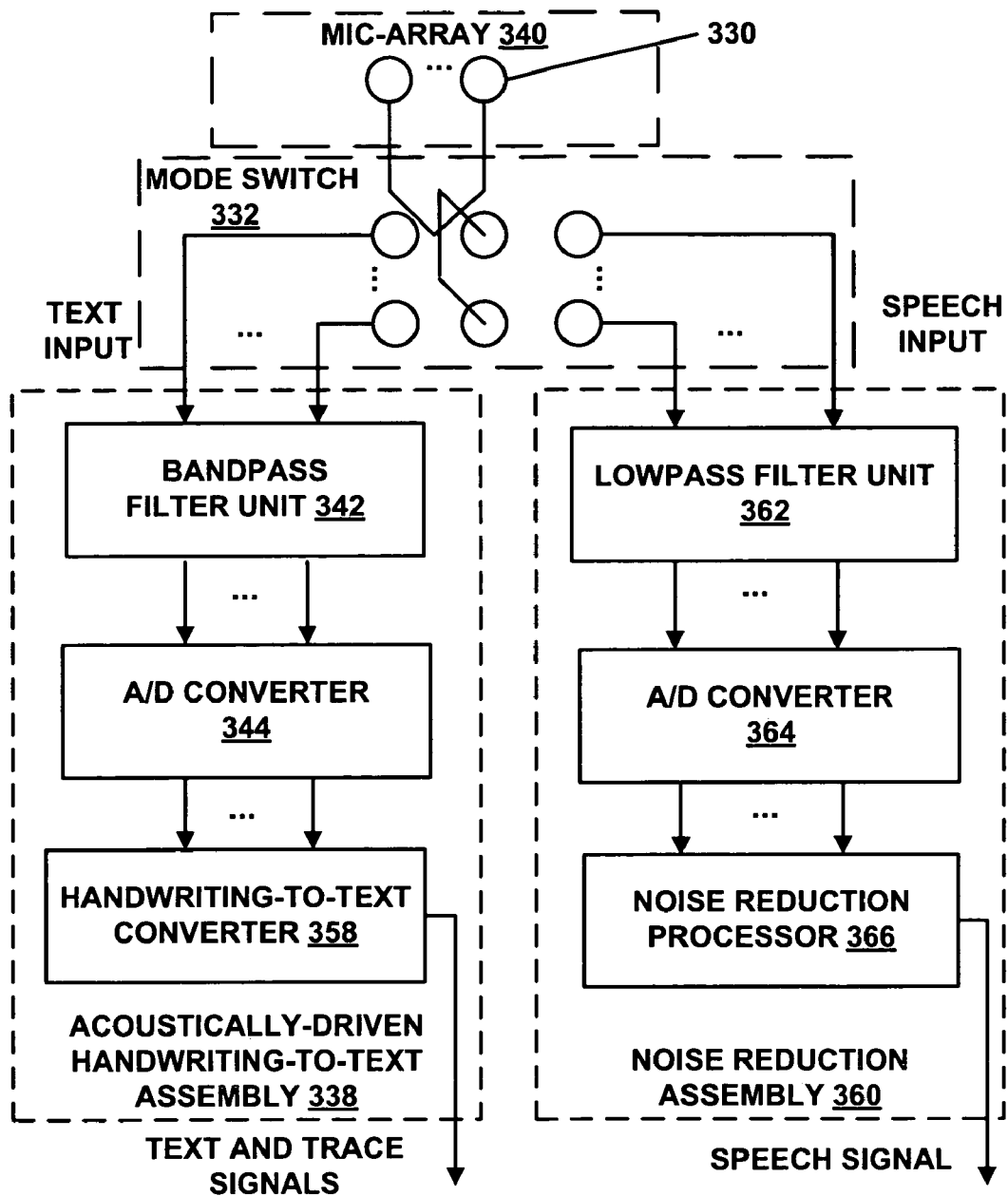
FIG. 9 illustrates an alternate embodiment of the mic-array for dual function operation in the embodiment of FIG. 5.

In alternative embodiment shown in FIG. 9, the mic-array 340 includes a plurality (two or more) of wide band acoustics sensors 330 having a frequency response in the range of 100 Hz to 22 kHz. The mic-array 340 functions to receive both the speech from the user, such as during a telephone call, and the sound signal 70. The range of the frequency response of sensors 330 would be a function of the speech input and the frequency of the sound signal 70 used for the text input. In this embodiment, a separate microphone 30 of embodiments shown in FIGS. 1, 2, 3 and 5 may not be needed.

The mic-array 340 is coupled to a mode switch 332 to simultaneously switch the paths of the plurality of wide band acoustics sensors 330 of the mic-array 340 between an acoustically-driven handwriting-to-text assembly 338 for a text input mode and a noise reduction assembly 360 for a speech input mode. In the embodiment of FIG. 9, the acoustically-driven handwriting-to-text assembly 338 is essentially the same as the acoustically-driven handwriting-to-text assembly 38, 138 or 238 except that the mic-array 340 is shared with the noise reduction assembly 360.

In the text input mode, the paths of the mic-array 340 are sent to bandpass filter unit 342 of the acoustically-driven handwriting-to-text assembly 338. The filtered signals are sent to an A/D converter 344 which are passed to the handwriting-to-text converter 350. The handwriting-to-text converter 350 functions the same as the handwriting-to-text converters 50 and 250.

In the speech input mode, the noise reduction assembly 360 interfaces with the mic-array 340 to receive speech from the user. However, oftentimes, noise is also sensed or picked up by the mic-array 340 as well. The received signal form the mic-array 340 is filtered by lowpass filter unit 362. Thereafter, the filtered signal is converted to a digital signal by A/D converter 364 and processed by noise reduction processor 366. The noise reduction processor 366 extracts of background noise or other noise in the environment so that the noise can be eliminated during a telephone call as speech is entered via the mic-array 340. The noise reduction processor 366 uses a temporal-spatial adaptive filter such as the blind source separation algorithm to separate the speech signal and the interfering noise.

The foregoing description of the embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the, invention in various embodiments and with various modifications as are suited to the particular use contemplated. It is intended that the scope of the invention be defined by the claims appended hereto, and their equivalents.

What is claimed as invention is:

1. A mobile device, comprising:
a housing having first and second display areas;
a mic-array integrated into the housing, the mic-array having a plurality of microphones operable to sense sound signals at multiple locations on the housing from a sound pen when handwriting an alphanumeric symbol on a surface separate from and in proximity to the housing; and
a handwriting-to-text converter that graphically represents on the first display area simulated handwritten traces of the alphanumeric symbol and that converts the alphanumeric symbol into a computer-readable interchange code, representative of the alphanumeric symbol, for display on the second display area;
wherein the mic-array comprises first and second microphones;
wherein each emitted sound signal from the sound pen is sensed by the first and second microphones which creates two received sound signals $y_1(l)$ and $y_2(l)$ defined by $$y_1(l) = \alpha_1 s(l-t_1) + \eta_1(l)$$

$$y_2(l) = \alpha_2 s(l-t_2) + \eta_2(l)$$

where l is the discrete time index; $t_1$ and $t_2$ are the times needed for the two sound signals to travel from the sound pen to the first and second microphones, respectively; $\alpha_i$, i=1,2 is an amplitude of the received sound signal; $\eta_i$, i=1,2 is background noise that is uncorrelated or independent to the emitted sound signal s(l) and to each other; and
wherein a correlation of the two received sound signals depends on a relative time delay of arrival (TODA), $\tau=|t_1-t_2|$ where the time $t_1$ is the time of arrival at the first microphone and the time $t_2$ is the time of arrival at the second microphone.

2. The mobile device of claim 1; wherein the TDOA is calculated as $$\tau = \max_{\tau} IDFT\left(\frac{Y_{12}}{|Y_1(k)||Y_2(k)|}\right)$$

wherein $Y_1(k)$ is a Discrete Fourier Transform (DFT) of $y_1(l)$ and $Y_2*(k)$ the DFT of $y_2(l)$ and * denotes a complex conjugate and which are defined as $$Y_1(k) = \alpha_1 S(k) + N_1(k)$$

$$Y_2(k) = \alpha_2 S(k) e^{-j\omega_k \tau} + N_2(k)$$

where S(k) is a N-point DFT of the emitted source signal s(l) (k=0, 1, , , , , L/2), $\omega_k = 2\pi k/L$; and wherein $Y_{12}$ is a cross correlation of the DFTs computed as $$Y_{12} = Y_1(k) Y_2*(k).$$

3. The mobile device of claim 2; wherein the amplitude of each received sound signal is inversely proportional to a square of a distance between the sound pen and each microphone and is represented by $$\alpha_i \propto \frac{1}{r_i^2} \quad i=1,2 \text{ and } \frac{\alpha_1}{\alpha_2} = \frac{r_2^2}{r_1^2}$$

where $r_i$, i=1,2 is an Euclidean distance between the sound pen and one of the first and second microphones, wherein an amplitude ratio defined as $$R = \frac{\alpha_1}{\alpha_2}$$

is a constant during a short time window and is estimated at the first and second microphones as $$\frac{r_2^2}{r_1^2} = \frac{(x-x_2)^2 + (y-y_2)^2}{(x-x_1)^2 + (y-y_1)^2} = R$$

where $x_i, y_i$, i=1,2 are known, fixed coordinates of the first and second microphones and are used to determine source location coordinates x and y to graphically represent, on the first display area, the simulated handwritten traces.

4. A mobile device, comprising:
a housing;
display means integrated in the housing for displaying on first and second display areas;
sensing means integrated in the housing for sensing sound signals from a sound pen at multiple locations on the housing when handwriting an alphanumeric symbol on a surface separate from and in proximity to the housing; and
representing and converting means for graphically representing, for display on the first display area, simulated handwritten traces of the alphanumeric symbol and for converting the alphanumeric symbol into a computer-readable interchange code, representative of the alphanumeric symbol, for display in the second display area;
wherein the sensing means includes first and second microphones;
wherein each emitted sound signal from the sound pen is sensed by the first and second microphones which creates two received sound signals $y_1(l)$ and $y_2(l)$ defined by $$y_1(l) = \alpha_1 s(l-t_1) + \eta_1(l)$$

$$y_2(l) = \alpha_2 s(l-t_2) + \eta_2(l)$$

where l is the discrete time index; $t_1$ and $t_2$ are the times needed for the two sound signals to travel from the sound pen to the first and second microphones, respectively; $\alpha_i$, i=1,2 is an amplitude of the received sound signal; $\eta_i$, i=1,2 is background noise that is uncorrelated or independent to the emitted sound signal s(l) and to each other; and
wherein a correlation of the two received sound signals depends on a relative time delay of arrival (TODA), $\tau=|t_1-t_2|$ where the time $t_1$ is the time of arrival at the first microphone and the time $t_2$ is the time of arrival at the second microphone.

5. The mobile device of claim 4; wherein the TDOA is calculated as $$\tau = \max_{\tau} IDFT\left(\frac{Y_{12}}{|Y_1(k)||Y_2(k)|}\right)$$

wherein $Y_1(k)$ is a Discrete Fourier Transform (DFT) of $y_1(l)$ and $Y_2^*(k)$ the DFT of $y_2(l)$ and * denotes a complex conjugate and which are defined as $Y_1(k)=\alpha_1 S(k)+N_1(k)$ $Y_2(k)=\alpha_2 S(k)e^{-j\omega_k\tau}+N_2(k)$ where $S(k)$ is a N-point DFT of the emitted source signal $s(l)$ ($k=0, 1, , , , , L/2$), $\omega_k=2\pi k/L$; and wherein $Y_{12}$ is a cross correlation of the DFTs computed as $Y_{12}=Y_1(k)Y_2^*(k)$.

6. The mobile device of claim 5; wherein the amplitude of each received sound signal is inversely proportional to a square of a distance between the sound pen and each microphone and is represented by $$\alpha_i \propto \frac{1}{r_i^2} \quad i=1,2 \text{ and } \frac{\alpha_1}{\alpha_2}=\frac{r_2^2}{r_1^2}$$

where $r_i$, $i=1,2$ is an Euclidean distance between the sound pen and one of the first and second microphones, wherein an amplitude ratio defined as $$R=\frac{\alpha_1}{\alpha_2}$$

is a constant during a short time window and is estimated at the first and second microphones as $$\frac{r_2^2}{r_1^2}=\frac{(x-x_2)^2+(y-y_2)^2}{(x-x_1)^2+(y-y_1)^2}=R$$

where $x_i,y_i$, $i=1,2$ are known, fixed coordinates of the first and second microphones and are used to determine source location coordinates x and y to graphically represent, on the first display area, the simulated handwritten traces.

7. A method of acoustically-driven text input for a mobile device having a housing with first and second display areas and a mic-array comprising first and second microphones positioned at different locations on the housing, comprising the steps of:

sensing in the first and second microphones sound signals from a sound pen while a user handwrites an alphanumeric symbol on a surface separate from and in proximity to the housing;

creating from the sensed sound signals two received sound signals $y_1(l)$ and $y_2(l)$ defined by $y_1(l)=\alpha_1 s(l-t_1)+\eta_1(l)$ $y_2(l)=\alpha_2 s(l-t_2)+\eta_2(l)$ where l is the discrete time index, $t_1$ and $t_2$ are times needed for the two sound signals to travel from the sound pen to the first and second microphones, respectively, $\alpha_i$, $i=1,2$ is an amplitude of the received sound signal, and $\eta_i$, $i=1,2$ is background noise that is uncorrelated or independent of the emitted sound signal $s(l)$ and to each other; and correlating the two received sound signals depending on a relative time delay of arrival (TODA), $\tau=|t_1-t_2|$ where time $t_1$ is a time of arrival at the first microphone and time $t_2$ is a time of arrival at the second microphone;

graphically representing on the first display area simulated handwritten traces of the alphanumeric symbol, wherein the graphically representing step includes the step of locating a sequence of pen locations derived from a first equation based on a difference in time of arrival of the sound signals and a second equation based on an amplitude ratio of the sound signals as the sound pen is moved;

converting the handwritten traces to a computer-readable interchange code representative of the alphanumeric symbol; and displaying in the second display area the converted alphanumeric symbol.

8. The method of claim 7; wherein the sound signal is in an inaudible frequency range.

9. The method of claim 7; further comprising the steps of switching the mic-array for speech input into the mobile device and sensing by the mic-array the speech input.

10. The method of claim 9; further comprising the step of reducing noise from the sensed speech input.

11. A mobile communications device, comprising:

a wireless communications transceiver operable to communicate wireless communications signals;

a housing having first and second display areas;

a sound pen for emitting sound signals when handwriting at least one alphanumeric symbol on a surface separate from and in proximity to the housing; and an acoustically-driven handwriting-to-text assembly for receiving sound signals emitted by the sound pen, graphically representing on the first display area simulated handwritten traces of the at least one alphanumeric symbol, and converting the at least one alphanumeric symbol into at least one computer-readable interchange code, representative of the at least one alphanumeric symbol, for display in the second display area;

wherein the acoustically-driven handwriting-to-text assembly includes first and second microphones;

wherein each emitted sound signal is received by the first and second microphones which creates two received sound signals $y_1(l)$ and $y_2(l)$ defined by $y_1(l)=\alpha_1 s(l-t_1)+\eta_1(l)$ $y_2(l)=\alpha_2 s(l-t_2)+\eta_2(l)$ where l is the discrete time index; $t_1$ and $t_2$ are the times needed for the two sound signals to travel from the sound pen to the first and second microphones, respectively; $\alpha_i$, $i=1,2$ is an amplitude of the sound signal as received; $\eta_i$, $i=1,2$ is background noise that is uncorrelated or independent to the emitted sound signal $s(l)$ and to each other; and wherein a correlation of the two received sound signals depends on a relative time delay of arrival (TODA), $\tau=|t_1-t_2|$ where the time $t_1$ is the time of arrival at the first microphone and the time $t_2$ is the time of arrival at the second microphone.

12. The mobile communications device of claim 11; wherein the TDOA is calculated as $$\tau = \max_\tau IDFT\left(\frac{Y_{12}}{|Y_1(k)||Y_2(k)|}\right)$$

wherein $Y_1(k)$ is a Discrete Fourier Transform (DFT) of $y_1(l)$ and $Y_2^*(k)$ the DFT of $y_2(l)$ and * denotes a complex conjugate and which are defined by $$Y_1(k)=\alpha_1 S(k)+N_1(k)$$

$$Y_2(k)=\alpha_2 S(k)e^{-j\omega_k\tau}+N_2(k)$$

where $S(k)$ is a N-point DFT of the emitted source signal $s(l)$ ($k=0, 1, \ldots, L/2$), $\omega_k=2\pi k/L$; and wherein $Y_{12}$ is a cross correlation of the DFTs computed as $$Y_{12}=Y_1(k)Y_2^*(k).$$

13. The mobile communications device of claim 12; wherein the amplitude of each received sound signal is inversely proportional to a square of a distance between the sound pen and each microphone and is represented by $$\alpha_i \propto \frac{1}{r_i^2} \quad i=1,2 \text{ and } \frac{\alpha_1}{\alpha_2}=\frac{r_2^2}{r_1^2}$$

where $r_i$, $i=1,2$ is an Euclidean distance between the sound pen and one of the first and second microphones, wherein an amplitude ratio defined as $$R=\frac{\alpha_1}{\alpha_2}$$

is a constant during a short time window and is estimated at the first and second microphones as $$\frac{r_2^2}{r_1^2}=\frac{(x-x_2)^2+(y-y_2)^2}{(x-x_1)^2+(y-y_1)^2}=R$$

where $x_i, y_i$, $i=1,2$ are known, fixed coordinates of the first and second microphones and are used to determine source location coordinates x and y to graphically represent, on the first display area, the simulated handwritten traces.

14. A computer program product for acoustically-driven text input for a mobile device having a housing with first and second display areas and a mic-array comprising first and second microphones positioned at different locations on the housing, comprising:
a non-transitory computer-readable medium having stored thereon computer-executable codes comprising:
a first set of codes for causing a computer to sense via the first and second microphones sound signals from a sound pen while a user handwrites an alphanumeric symbol on a surface separate from and in proximity to the housing;
a second set of codes for causing the computer to create from the sensed sound signals two received sound signals $y_1(l)$ and $y_2(l)$ defined by $$y_1(l)=\alpha_1 s(l-t_1)+\eta_1(l)$$

$$y_2(l)=\alpha_2 s(l-t_2)+\eta_2(l)$$

where l is the discrete time index, $t_1$ and $t_2$ are times needed for the two sound signals to travel from the sound pen to the first and second microphones, respectively, $\alpha_i$, $i=1,2$ is an amplitude of the received sound signal, and $\eta_i$, $i=1,2$ is background noise that is uncorrelated or independent of the emitted sound signal $s(l)$ and to each other;
a third set of codes for causing a computer to correlate the two received sound signals depending on a relative time delay of arrival (TODA), $\tau=|t_1-t_2|$ where time $t_1$ is a time of arrival at the first microphone and time $t_2$ is a time of arrival at the second microphone;
a fourth set of codes for causing a computer to graphically represent on the first display area simulated handwritten traces of the alphanumeric symbol, wherein the graphically representing step includes the step of locating a sequence of pen locations derived from a first equation based on a difference in time of arrival of the sound signals and a second equation based on an amplitude ratio of the sound signals as the sound pen is moved;
a fifth set of codes for causing the computer to convert the handwritten traces to a computer-readable interchange code representative of the alphanumeric symbol; and
a sixth set of codes for causing the computer to display in the second display area the converted alphanumeric symbol.

15. The computer program product of claim 14, wherein the sound signal is in an inaudible frequency range.

16. The computer program product of claim 14, wherein the computer-readable medium further comprises code for causing the computer to switch the mic-array for speech input into the mobile device and sensing by the mic-array the speech input.

17. The computer program product of claim 16, wherein the computer-readable medium further comprises code for causing the computer to reduce noise from the sensed speech input.

18. The method of claim 7, further comprising:
calculating the TDOA as $$\tau = \max_\tau IDFT\left(\frac{Y_{12}}{|Y_1(k)||Y_2(k)|}\right)$$

wherein $Y_1(k)$ is a Discrete Fourier Transform (DFT) of $y_1(l)$ and $Y_2^*(k)$ the DFT of $y_2(l)$ and * denotes a complex conjugate and which are defined as $$Y_1(k)=\alpha_1 S(k)+N_1(k)$$

$$Y_2(k)=\alpha_2 S(k)e^{-j\omega_k\tau}+N_2(k)$$

where $S(k)$ is a N-point DFT of the emitted source signal $s(l)$ ($k=0, 1, \ldots, L/2$), $\omega_k=2\pi k/L$; and
computing a cross correlation of the DFTs, $Y_{12}$, as $$Y_{12}=Y_1(k)Y_2^*(k).$$

19. The method of claim 18, wherein the amplitude of each received sound signal is inversely proportional to a square of a distance between the sound pen and each microphone and is represented by $$\alpha_i \propto \frac{1}{r_i^2} \quad i=1,2 \text{ and } \frac{\alpha_1}{\alpha_2}=\frac{r_2^2}{r_1^2}$$

where $r_i$, $i=1,2$ is an Euclidean distance between the sound pen and one of the first and second microphones, wherein an amplitude ratio defined as $$R = \frac{\alpha_1}{\alpha_2}$$

is a constant during a short time window and is estimated at the first and second microphones as $$\frac{r_2^2}{r_1^2} = \frac{(x-x_2)^2 + (y-y_2)^2}{(x-x_1)^2 + (y-y_1)^2} = R$$

where $x_i, y_i$, i=1,2 are known, fixed coordinates of the first and second microphones, and
wherein graphically representing on a first display area of the mobile device simulated handwritten traces of the alphanumeric symbol comprises using the fixed coordinates of the first and second microphones to determine source location coordinates x and y for graphically representing on the first display area the simulated handwritten traces.

20. The computer program product of claim 14, wherein the stored computer-executable instructions further comprise:
a seventh set of codes for causing the computer to calculate the TDOA as $$\tau = \max_\tau IDFT\left(\frac{Y_{12}}{|Y_1(k)||Y_2(k)|}\right)$$

wherein $Y_1(k)$ is a Discrete Fourier Transform (DFT) of $y_1(l)$ and $Y_2^*(k)$ the DFT of $y_2(l)$ and * denotes a complex conjugate and which are defined as $Y_1(k) = \alpha_1 S(k) + N_1(k)$ $Y_2(k) = \alpha_2 S(k) e^{-j\omega_k \tau} + N_2(k)$ where S(k) is a N-point DFT of the emitted source signal s(l) (k=0, 1, , , , , L/2), $\omega_k = 2\pi k/L$; and an eighth set of codes for causing the computer to compute a cross correlation of the DFTs, $Y_{12}$, as $Y_{12} = Y_1(k) Y_2^*(k)$.

21. The computer program product of claim 20, wherein the amplitude of each received sound signal is inversely proportional to a square of a distance between the sound pen and each microphone and is represented by $$\alpha_i \propto \frac{1}{r_i^2} \ i = 1, 2 \text{ and } \frac{\alpha_1}{\alpha_2} = \frac{r_2^2}{r_1^2}$$

where $r_i$, i=1,2 is an Euclidean distance between the sound pen and one of the first and second microphones, wherein an amplitude ratio defined as $$R = \frac{\alpha_1}{\alpha_2}$$

is a constant during a short time window and is estimated at the first and second microphones as $$\frac{r_2^2}{r_1^2} = \frac{(x-x_2)^2 + (y-y_2)^2}{(x-x_1)^2 + (y-y_1)^2} = R$$

where $x_i, y_i$, i=1,2 are known, fixed coordinates of the first and second microphones, and
wherein the fourth set of codes for causing a computer to graphically represent on the first display area of the mobile device simulated handwritten traces of the alphanumeric symbol uses the fixed coordinates of the first and second microphones to determine source location coordinates x and y for graphically representing on the first display area the simulated handwritten traces.

* * * * *